United States Patent [19]
Kuwayama

[11] Patent Number: 6,133,562
[45] Date of Patent: Oct. 17, 2000

[54] OPTICAL DISK APPARATUS

[75] Inventor: Yasunori Kuwayama, Osaka, Japan

[73] Assignee: Funai Electric Co., Ltd., Osaka, Japan

[21] Appl. No.: 09/266,120

[22] Filed: Mar. 10, 1999

[30] Foreign Application Priority Data

Mar. 17, 1998 [JP] Japan .................................. 10-066310

[51] Int. Cl.[7] .................................................. G11B 7/00
[52] U.S. Cl. ................................ 250/201.5; 369/44.25; 369/44.28
[58] Field of Search ...................... 250/201.5; 369/44.28, 369/44.25, 44.29, 44.32, 44.35

[56] References Cited

U.S. PATENT DOCUMENTS 5,483,509 1/1996 Yang et al. ........................... 369/44.23
5,903,530 5/1999 Tateishi et al. ....................... 369/44.29

FOREIGN PATENT DOCUMENTS 6-251384  9/1994  Japan .
09044982  2/1997  Japan .

*Primary Examiner*—Huy Mai
*Attorney, Agent, or Firm*—Lackenbach Siegel

[57] ABSTRACT

An optical disk apparatus comprises a focus error detecting section for detecting whether a focus error in a focus servo operation during a seek operation which is an optical pickup is moved from a given position on an optical disk to another given position, and a moving control section for moving the optical pickup toward an inner peripheral side of the optical disk by a predetermined degree to conduct a focus search when the focus error detection section detects the focus error.

11 Claims, 3 Drawing Sheets

OPTICAL DISK APPARATUS

BACKGROUND OF THE INVENTION

The present invention relates to an optical disk apparatus, and more particularly to an optical disk apparatus in which a recovery operation in the case where a focus error occurs during a seek operation of moving an optical pickup from a given position of an optical disk to another given position is made faster.

In an optical disk apparatus, when a focus error occurs for any reason during a seek operation of moving an optical pickup from a given position of an optical disk to another given position, a focus search (focusing) is again conducted and the seek operation is then restarted.

In a first related art, a focus search in the case where a focus error has occurred is conducted in the following manner.

A focus search is carried out in the place where the focus error has occurred. Until the focusing is attained, the focus search in the place is retried three times. Only when the focusing is not attained the focusing even after the focus search is retried three times, the optical pickup is moved toward the innermost periphery of the disk, and then the seek operation is again carried out.

In a second related art which is an access method in a CD player disclosed in Unexamined Japanese Patent Publication No. 6-251384A, when an optical pickup (optical head) causes a head jump, the focusing operation is automatically performed. When a head jump occurs during reproduction, a focus search is again conducted in the place. If this focusing is failed, the optical pickup is then moved from the current position toward the outer peripheral side by several millimeters, and a focus search is again conducted. If focusing is not attained even after the process of conducting a focus search with moving the pickup toward the outer peripheral side by several millimeters is performed several times, a process is finally carried out in which the optical pickup is moved to the innermost periphery and then the seek operation is again conducted.

During a seek operation of moving an optical pickup from a given position of an optical disk to another given position, a focus error is mainly caused by a movement of the optical pickup in which the pickup happens to be moved out of an area below the disk, namely, outside of the outer peripheral end of the optical disk for any reason. In such a case, when the related focus search operations such as that described above are conducted, a long time period is required for attaining the focusing.

In the first related art, a focus search is conducted three times in the place where a focus error has occurred. In the case where the optical pickup has been moved to the outside of the optical disk, however, the focusing cannot be attained even by the three retries, and hence the time period for the retries is wasted. In the second related art, the process in which a focus search is again conducted in the place where the focus error has occurred and then conducted with moving the pickup toward the outer peripheral side by several millimeters is repeated several times. During a time period when the process is repeatedly performed, the focusing cannot be made close, and hence the time period is wasted.

An example in which the optical disk apparatus is a CD-ROM drive connected to a personal computer will be considered. When a focus error occurs during a seek operation, it is required to conduct a focus search to attain the focusing, thereby enabling the seek operation to be rapidly restarted. If the seek operation cannot be restarted, there arises a serious situation in which execution of an application software is halted and the personal computer produces an error message.

In both of the above-described related arts, however, there is a problem in that, when a focus error is caused because the optical pickup happens to be moved to the outside of the optical disk, a prolonged time period is required for attaining the focusing and hence the personal computer produces an error message.

SUMMARY OF THE INVENTION

It is therefore an object of the invention to provide an optical disk apparatus in which, even when a focus error such as that an optical pickup happens to be moved to the outside of an optical disk occurs during a seek operation, the focusing can be rapidly attained.

In order to achieve the object, there is provided an optical disk apparatus comprising: a focus error detecting section for detecting whether a focus error in a focus servo operation during a seek operation which is an optical pickup is moved from a given position on an optical disk to another given position; and a moving control section for moving the optical pickup toward an inner peripheral side of the optical disk by a predetermined degree to conduct a focus search when the focus error detection section detects the focus error.

The moving control section immediately moves the optical pickup toward the inner peripheral side of the optical disk without conducting the focus search at where the focus error is occurred when the focus error detection section detects the focus error.

It may be configured that the moving control section moves the optical pickup toward the inner peripheral side of the optical disk by a distance which, when the optical pickup jumps out to the outside of the optical disk, allows the optical pickup to be surely returned to an area below the optical disk.

It may be configured that the moving control section moves the optical pickup toward the inner peripheral side of the optical disk by a distance between an outer movable limit position of the optical pickup and an outer periphery of the optical disk.

It may be configured that the moving control section moves the optical pickup toward the inner peripheral side of the optical disk by a time period which, when the optical pickup jumps out to the outside of the optical disk, allows the optical pickup to be surely returned to an area below the optical disk.

It may be configured that the moving control section moves the optical pickup toward the inner peripheral side of the optical disk by a time period which allows the optical pickup to be moved a distance between an outer movable limit position of the optical pickup and an outer periphery of the optical disk.

DETAILED DESCRIPTION OF THE PREFERRED EMBODIMENTS

A preferred embodiment of the present invention will be described below with reference to the accompanying drawings.

Figure 1:
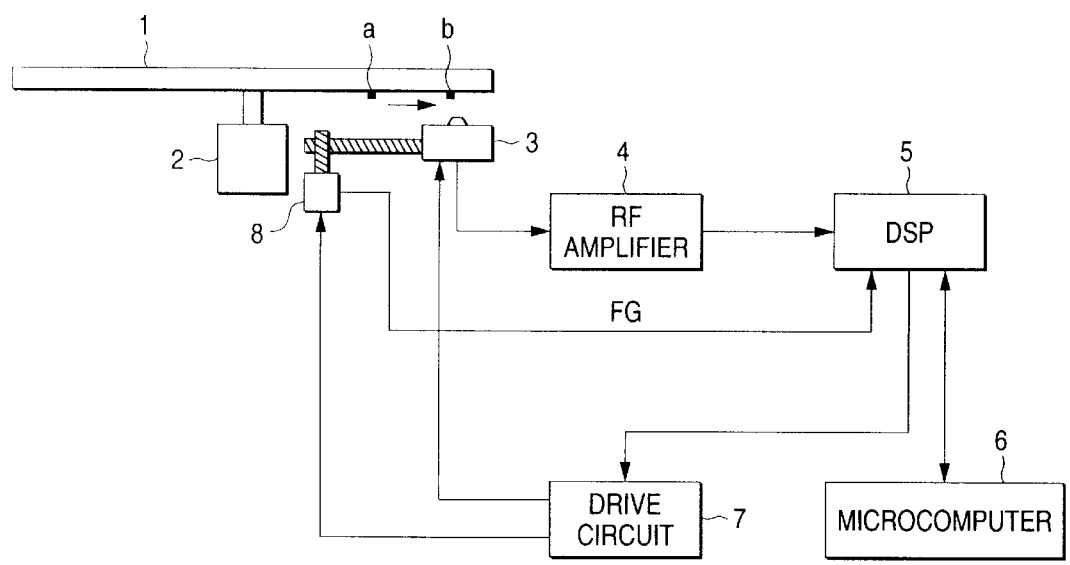
FIG. 1 is a block diagram showing the electric configuration of the optical disk apparatus according to the present invention.

FIG. 1 is a block diagram showing the electric configuration of the optical disk apparatus according the present invention.

An optical pickup 3 detects information from an optical disk 1 which is rotated by a disk motor 2. The optical pickup is disposed so as to be opposed to the optical disk 1, and also to be movable in parallel with the optical disk 1 and in a radial direction of the optical disk 1. The output of the optical pickup 3 which is disposed in this way is supplied to a DSP (Digital Signal Processor) 5 through an RF amplifier 4.

The DSP 5 is a block which, under the control of a microcomputer 6 and based on a signal that is detected from the optical disk 1 by the optical pickup 3, performs the control of the whole optical disk apparatus, including the focusing servo control, the tracking servo control, and the feed movement control of moving the optical pickup 3 from a given position of the optical disk 1 to another given position. Therefore, the DSP 5 outputs, through a drive circuit 7, a servo control signal for the focusing servo control and the tracking servo control of the optical pickup 3, and also a kick signal for the feed movement of the optical pickup 3.

FG pulses which are output from a frequency generator (not shown) attached to a feed motor 8 are supplied to the DSP 5. On the basis of the FG pulses, the number of revolutions of the feed motor 8 is measured in the following manner. The distance by which the optical pickup 3 is advanced in a radial direction of the optical disk 1 when the feed motor 8 makes one rotation is previously known. Therefore, the moving distance of the optical pickup 3 in a radial direction can be measured (calculated) on the basis of the FG pulses.

Figure 2:
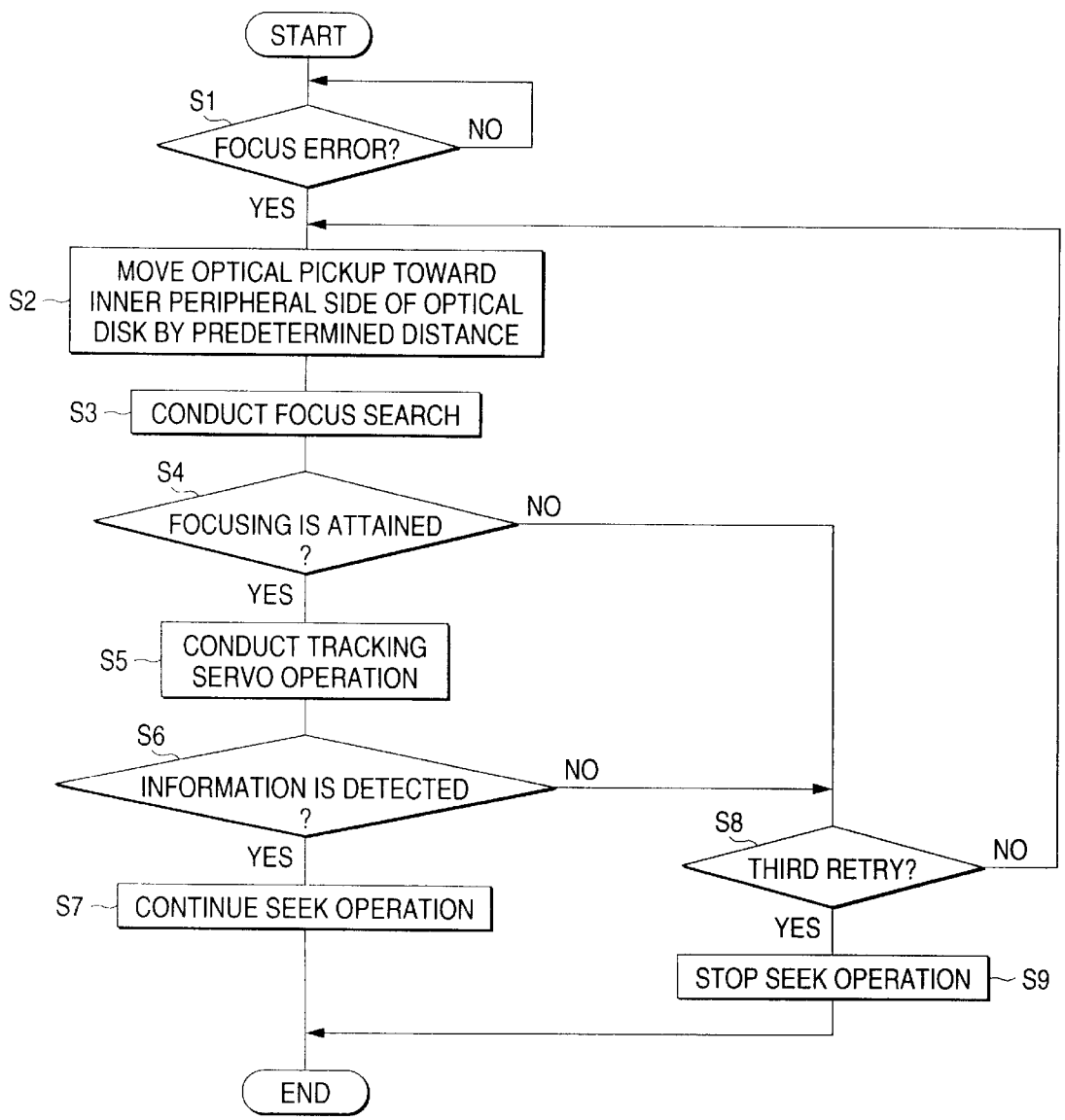
FIG. 2 is a flowchart illustrating a seek operation of the optical disk apparatus according to the present invention.

Next, an operation of the thus configured optical disk apparatus, i.e., a seek operation of moving the optical pickup 3 from a given position of the optical disk 1 to another given position will be described with reference to the flowchart of FIG. 2.

During a seek operation of moving the optical pickup 3 from a given position (for example, the point A of FIG. 1) of the optical disk 1 to another given position (for example, the point B of FIG. 1), the DSP 5 conducts the focusing servo control on the basis of a focus error signal which is extracted from a light signal detected by the optical pickup 3.

Figure 3:
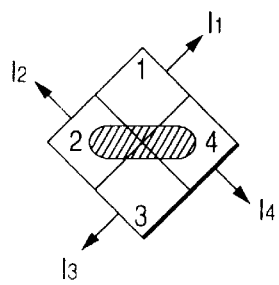
FIGS. 3(A) to (C) is schematic illustrations of an optical head of the optical disk apparatus for explaining a judgement of the focusing.
Figure 3:
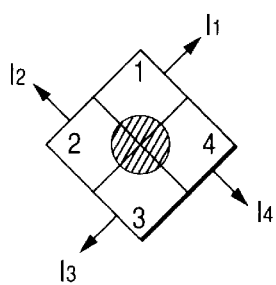
Figure 3:
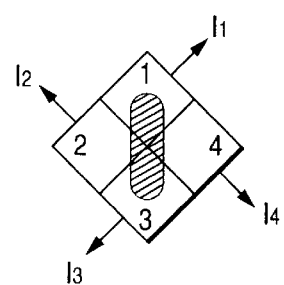

For example, in the well-known astigmatism method, a laser beam emitted from a light source (not shown) is reflected by a signal recording surface of the optical disk 1 and detected by the optical pickup 3 as the light signal. The optical pickup 3 comprises four-divided photo detectors as shown in FIGS. 3(A) to (C). When the focusing is properly attained, a circular light spot is obtained on the photo detectors as shown in FIG. 3(B). Alternatively, when the optical disk 1 is deviated from the focal position, the light spot becomes into an ellipsoidal shape extending traversally or vertically as shown in FIGS. 3(A) and (C). FIG. 3(A) shows a case wherein the optical disk 1 is located too distant from the optical pickup 3, and FIG. 3(C) shows a case wherein the optical disk 1 is located too close to the optical pickup 3 in view of the focal point.

Figure 4:
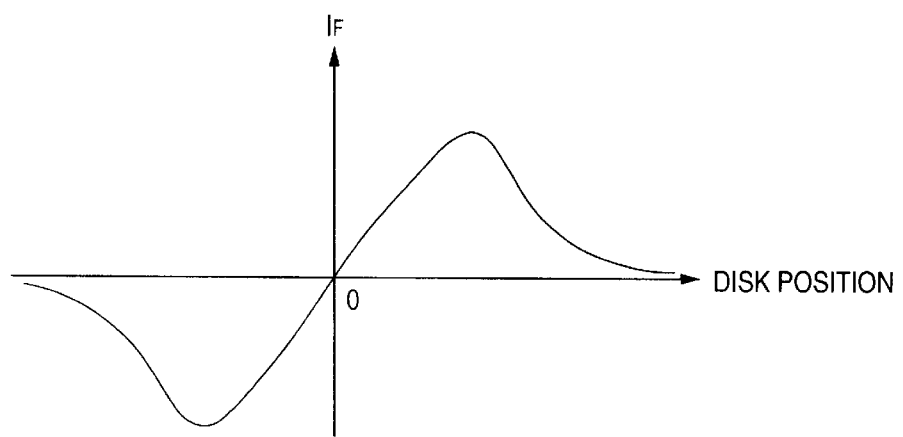
FIG. 4 is a schematic illustration showing a signal utilized for judging the focusing.

Therefore, monitoring a signal $I_F=(I_1+I_3)-(I_2+I_4)$, where $I_1-I_4$ are output signal from the respective photo detectors, it is possible to know whether the optical disk 1 is on focus, and whether the optical disk 1 is located too distant or too close with respect to the optical pickup 3. As shown in FIG. 4, the signal $I_F$ becomes zero when the focusing is attained. To judging the focal point, a RFDC signal ($I_s=I_1+I_2+I_3+I_4$) is also referred in addition to the judgement by means of the signal $I_F$.

When the optical pickup 3 happens to be moved to the outside of the optical disk 1 for any reason (an impact on the apparatus, a scratch on a track of the optical disk 1, or the like) during the seek operation, both of the RFDC signal and the signal $I_F$ cannot be obtained.

When a focus error is detected as a result of disappearing of the RFDC signal or the signal $I_F$ (step S1), the DSP 5 controls the feed motor 8 through the drive circuit 7 so as to move the optical pickup 3 toward the inner peripheral side by a predetermined distance (step S2). In the embodiment, the predetermined distance by which the optical pickup is moved toward the inner peripheral side is about 5 mm. This value of 5 mm is selected as a distance which, when the optical pickup 3 jumps out to the outside of the optical disk 1, allows the optical pickup to be surely returned into the optical disk 1. This distance is slightly varied depending on the kind of the optical disk apparatus, namely, it depends of a distance between an outer movable limit position of the optical head 3 and the outer periphery of the optical disk 1. In this case, the movement is controlled by substantially measuring the moving distance of the optical pickup 3 in a radial direction on the basis of the measurement of the FG pulses which are output from the frequency generator attached to the feed motor 8.

When the optical pickup 3 is moved toward the inner peripheral side by the predetermined distance, the DSP 5 conducts a focus search in the position (step S3), and judges whether the focusing is attained or not (step S4). If it is judged that the focusing is attained, a tracking servo control is then performed (step S5), and it is judged whether information can be detected from a track of the optical disk 1 or not (step S6). If it is judged that information can be detected from a track of the optical disk 1, the seek operation is continued from the position (step S7).

If it is judged in step S4 that the focusing is not attained, the control returns through step S8 to step S2 to again perform the process of moving the optical pickup 3 toward the inner peripheral side by the predetermined distance. Also in the case where information can be detected in step S6 from a track of the optical disk 1, the control returns through step S8 to step S2 to again perform the process of moving the optical pickup 3 toward the inner peripheral side by the predetermined distance. When this retry process is performed three times, the DSP 5 judges that a focus error has occurred, and stops the seek operation (step S9).

In the process described above, the retry is performed three times. In the embodiment, the predetermined distance is selected to be a distance which, when the optical pickup 3 jumps out to the outside of the optical disk 1, allows the optical pickup to be surely returned into the optical disk 1. In an actual case, therefore, the control seldom proceeds to step S8 because the optical head 3 is recovered to the area below the optical disk 1 at once due to the above selection of the moving distance.

As described above, in the invention, when the optical pickup 3 happens to be moved to the outside of the optical disk 1 for any reason during the seek operation, the optical pickup 3 is returned toward the inner peripheral side of the optical disk 1 by the predetermined distance (about 5 mm) which allows the optical pickup to be surely recovered into the area below the optical disk 1. Therefore, the time period from occurrence of a focus error to a restart of the seek operation (i.e., the retry time period) can be shortened. In the case where the optical disk apparatus is, for example, a CD-ROM drive, even when a focus error occurs during a seek operation, therefore, it is possible to avoid a serious situation in which the focus error causes execution of an application software to be halted and the personal computer produces an error message.

In the embodiment described above, a focus error is caused by an accidental movement of the optical pickup 3 toward the outside of the optical disk 1. The cause of a focus error is not restricted to the above. Even for a focus error caused by another reason, when a process similar to that described above is performed, the focusing can be promptly attained.

In the embodiment, when a focus error occurs, the optical pickup 3 is moved to the inner peripheral side of the optical disk 1 by the predetermined distance (about 5 mm). Alternatively, the control may be conducted on a time period in place of a distance. Namely, when a focus error occurs, the optical pickup 3 may be moved by a degree corresponding to a predetermined time period (for example, about 50 ms), toward the inner peripheral side. The predetermined time period is selected to be a time period which, when the optical pickup 3 jumps out to the outside of the optical disk 1, allows the optical pickup to be surely returned into the optical disk 1.

The optical disk apparatus of the invention can be applied also to any apparatus, other than a CD-ROM drive described above, in which information is reproduced by using an optical pickup, such as that for a CD, a CDR, an MD, an MO, ora DVD.

Although the present invention has been shown and described with reference to specific preferred embodiments, various changes and modifications will be apparent to those skilled in the art from the teachings herein. Such changes and modifications as are deemed to come within the spirit, scope and contemplation of the invention as defined in the appended claims.

The optical disk apparatus of the invention is configured so that, when it is detected the focus error during a seek operation of moving the optical pickup from a given position of an optical disk to another given position, a focus search is not conducted in the position of the focus error, the optical pickup is immediately moved toward an inner peripheral side by a degree corresponding to a predetermined distance or a predetermined time period, and a focus search is then conducted. The predetermined distance or the predetermined time period is set to be a distance or a time period which, when the optical pickup jumps out to the outside of the optical disk, allows the optical pickup to be surely returned into the optical disk. Even when a focus error occurs during a seek operation, therefore, the focusing can be rapidly attained, so that the seek operation can be promptly restarted. In other words, the time period from occurrence of a focus error to a restart of the seek operation (the retry time period) can be shortened. According to this configuration, in the case where the optical disk apparatus of the invention is, for example, a CD-ROM drive, even when a focus error occurs during a seek operation, it is possible to avoid a serious situation in which the focus error causes execution of an application software to be halted and a personal computer produces an error message.

What is claimed is:

1. An optical disk apparatus comprising:
   a focus error detecting section for detecting whether a focus error in a focus servo operation during a seek operation which is an optical pickup is moved from a given position on an optical disk to another given position; and
   a moving control section for moving the optical pickup toward an inner peripheral side of the optical disk by a predetermined degree to conduct a focus search when the focus error detection section detects the focus error.

2. The optical disk apparatus as set forth in claim 1, wherein the moving control section moves the optical pickup toward the inner peripheral side of the optical disk by a distance which, when the optical pickup jumps out to the outside of the optical disk, allows the optical pickup to be surely returned to an area below the optical disk.

3. The optical disk apparatus as set forth in claim 2, wherein the moving control section moves the optical pickup toward the inner peripheral side of the optical disk by a distance between an outer movable limit position of the optical pickup and an outer periphery of the optical disk.

4. The optical disk apparatus as set forth in claim 1, wherein the moving control section moves the optical pickup toward the inner peripheral side of the optical disk by a time period which, when the optical pickup jumps out to the outside of the optical disk, allows the optical pickup to be surely returned to an area below the optical disk.

5. The optical disk apparatus as set forth in claim 4, wherein the moving control section moves the optical pickup toward the inner peripheral side of the optical disk by a time period which allows the optical pickup to be moved a distance between an outer movable limit position of the optical pickup and an outer periphery of the optical disk.

6. The optical disk apparatus as set forth in claim 1, wherein the moving control section immediately moves the optical pickup toward the inner peripheral side of the optical disk without conducting the focus search at where the focus error is occurred when the focus error detection section detects the focus error.

7. A moving control method for an optical pickup in an optical disk apparatus comprising the steps of:
   detecting whether a focus error in a focus servo operation during a seek operation which is an optical pickup is moved from a given position on an optical disk to another given position;
   moving immediately the optical pickup toward an inner peripheral side of the optical disk by a predetermined degree without conducting a focus search at where the focus error is occurred when the focus error is detected; and
   conducting the focus search at where the optical pickup is moved.

8. The moving control method as set forth in claim 7, wherein the optical pickup is moved toward the inner peripheral side of the optical disk by a distance which, when the optical pickup jumps out to the outside of the optical disk, allows the optical pickup to be surely returned to an area below the optical disk.

9. The moving control method as set forth in claim 8, wherein the optical pickup is moved toward the inner peripheral side of the optical disk by a distance between an outer movable limit position of the optical pickup and an outer periphery of the optical disk.

10. The moving control method as set forth in claim 7, wherein the optical pickup is moved toward the inner peripheral side of the optical disk by a time period which, when the optical pickup jumps out to the outside of the optical disk, allows the optical pickup to be surely returned to an area below the optical disk.

11. The moving control method as set forth in claim 10, wherein the optical pickup is moved toward the inner peripheral side of the optical disk by a time period which allows the optical pickup to be moved a distance between an outer movable limit position of the optical pickup and an outer periphery of the optical disk.

* * * * *